(12) United States Patent
Zielinski et al.

(10) Patent No.: US 11,457,341 B2
(45) Date of Patent: Sep. 27, 2022

(54) APPARATUSES, METHOD AND COMPUTER PROGRAMS FOR A FIRST VEHICLE AND FOR A SECOND VEHICLE

(71) Applicant: Volkswagen Aktiengesellschaft, Wolfsburg (DE)

(72) Inventors: Ernst Zielinski, Bochum (DE); Ahmad El Assaad, Wolfsburg (DE); Joakim Cerwall, Stockholm (SE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 66 days.

(21) Appl. No.: 16/892,355

(22) Filed: Jun. 4, 2020

(65) Prior Publication Data

US 2020/0389773 A1    Dec. 10, 2020

(30) Foreign Application Priority Data

Jun. 7, 2019 (EP) .................................. 19179147

(51) Int. Cl.
*H04W 4/46* (2018.01)
*H04W 4/029* (2018.01)
(Continued)

(52) U.S. Cl.
CPC .............. *H04W 4/46* (2018.02); *H04W 4/029* (2018.02); *H04W 4/12* (2013.01); *H04W 72/082* (2013.01)

(58) Field of Classification Search
CPC ......... H04W 4/46; H04W 4/029; H04W 4/12; H04W 4/02; H04W 72/082; H04W 72/02;
(Continued)

(56) References Cited

U.S. PATENT DOCUMENTS

| 6,397,149 B1* | 5/2002 | Hashimoto ..........  G05D 1/0297 455/99 |
| 2018/0146471 A1 | 5/2018 | Xu et al. |
| 2019/0219688 A1* | 7/2019 | Liu .......................... G01S 13/89 |

FOREIGN PATENT DOCUMENTS

| EP | 3301985 A1 | 4/2018 |
| EP | 3340704 A1 | 6/2018 |
| EP | 3386256 A1 | 10/2018 |
| EP | 3425837 A1 | 1/2019 |

(Continued)

OTHER PUBLICATIONS

LG Electronics Inc (Rapporteur): "eV2X TR Update" 3GPP Draft; S1-163301 WAS045 Update of 22886-100, 3rd Generation Partnership Project (3GPP), Mobile Competence Centre; 650, Route Des Lucioles; F-06921 Sophia-Antipolis Cedex; France, vol. SA WG1, No. Tenerife, Spain, Nov. 10, 2016; retrieved from the Internet: URL:http://www.3gpp.org/ftp/Meetings_3GPP_SYNC/SA1/Docsstatus/docs/p. 10-14, 18-18, 21-22.

(Continued)

*Primary Examiner* — Farid Seyedvosoghi
(74) *Attorney, Agent, or Firm* — 2SPL Patent Attorneys PartG mbB; Kieran O'Leary

(57) ABSTRACT

The present invention relates to apparatuses, method and computer programs for a first vehicle and for a second vehicle. The method for the first vehicle is suitable for determining scheduling information for a wireless communication in a mobile communication system. The method comprises receiving one or more wireless messages via the mobile communication system. A content of the one or more wireless messages indicates a location of one or more second vehicles. The method comprises determining information related to a presence of the one or more second vehicles in a vicinity of the first vehicle based on the content of the received one or more wireless messages. The method comprises determining the scheduling information for the wireless communication based on the presence of the one or (Continued)

more second vehicles. The method comprises communicating in the mobile communication system based on the scheduling information.

16 Claims, 3 Drawing Sheets

(51) Int. Cl.
*H04W 4/12* (2009.01)
*H04W 72/08* (2009.01)

(58) Field of Classification Search
CPC ......... H04W 72/1289; H04W 72/1263; H04W 76/14
See application file for complete search history.

(56) References Cited

FOREIGN PATENT DOCUMENTS

| WO | WO-2017054876 A1 | * | 4/2017 | ........... H04L 5/0055 |
| WO | 2017197393 A1 | | 11/2017 | |
| WO | WO-2017197393 A1 | * | 11/2017 | .......... H04W 72/082 |

OTHER PUBLICATIONS

Nokia et al: "D2D Communication without network coverage", 3GPP Draft; R1-134535, 3rd Generation Partnership Project (3GPP), Mobile Competence Centre; 650, Route Des Lucioles; F-06921 Sophia-Antipolis Cedex; France, VOLRAN WG1, No. Guangzhou, China; Oct. 7, 2013-Oct. 11, 2013; Sep. 28, 2013; retrieved from the Internet: URL:http://www.3gpp.org/ftp/tsg_ran/WG1_RL1/TSGR1_74b/Docs/retrieved on 2013_09_28.

* cited by examiner

APPARATUSES, METHOD AND COMPUTER PROGRAMS FOR A FIRST VEHICLE AND FOR A SECOND VEHICLE

CROSS-REFERENCE TO A RELATED APPLICATION

This application claims priority under 35 U.S.C. § 119(a) to European Application (EP) No. 19179147.4, filed on Jun. 7, 2019. The contents of the earlier filed application are incorporated by reference herein in their entirety.

FIELD

The present invention relates to apparatuses, method, and computer programs for a first vehicle and for a second vehicle, more specifically, but not exclusively, to determining and using scheduling information based on a content of one or more wireless messages.

BACKGROUND

Vehicular communication is a field of research and development. To improve the driving experiences comparable or better to human control experience, vehicles are expected to use Vehicle-to-Vehicle-Communication (V2V) and Vehicle-to-Network (V2N) communication, e.g. to coordinate driving maneuvers and/or to receive tele-operated driving instructions. This communication is generally wireless, i.e. vehicles may wirelessly communicate with other vehicles in their vicinity and/or with backend services via cellular mobile communication systems.

European patent application EP 3425837 A1 shows a method and apparatus for a coexistence of device-to-device communications and cellular communications in mobile communications system. International patent application WO 2017197393 A1 shows a user equipment (UE) and evolved Node B (eNode B) that reselect resources in a vehicle-to-vehicle (V2V) communication system according to channel congestion. European patent applications EP 3340704 A1, EP 3386256 A1 and EP 3301985 A1 also relate to resource allocation in mobile communication systems.

US patent application US 2018/014671 A1 relates to a method and apparatus for grouping vehicles in an internet of vehicles. In said application, vehicles are being grouped outside a coverage area of Road Side Units. A lead vehicle asks other vehicles to join its vehicle team. If a new vehicle wants to join the team of the lead vehicle, it transmits a message (including its position) to the vehicle. Once a vehicle has joined the team, the lead vehicle transmits a resource pool to be used for communicating among the team as acceptance message to the joining vehicle.

In a submission denoted "eV2X TR Update", by LG Electronics to 3GPP, TSG-SA WGI #76, S1-1 63301, the concept of collective perception of the environment is shown.

In general, all of the above patent applications relate to the management of resources in vehicular communication. For example, if vehicles are in coverage of a base station of a mobile communication system, the mobile communication system may provide the scheduling of the radio resources, e.g. as shown in EP 3340704 A1. Out of coverage of a base station of the mobile communication system, an opportunistic scheme may be used (e.g. using listen before talk), or the scheduling resources may be pre-configured by a base station (to be used when out of coverage). The former approach may be error-prone, while the second approach may leave many resources unused.

As wireless communication occurs over a shared medium, which may be limited by the availability of radio resources, there may be a desire to provide an improved concept for radio resource management in vehicular communication.

SUMMARY

Embodiments are based on the finding that, in order to enable an efficient usage of radio resources in an out-of-coverage scenario, an opportunistic scheme may be used that is not based on the sensing of other participants based on the received signals themselves (e.g. by evaluating an amount of communication occurring around a vehicle), but by analyzing a content of wireless messages received from other vehicles, e.g. to extract the location of the other vehicles and/or of vehicles perceived by the other vehicles. This information may be used to determine whether the vehicle is in a situation, in which interference from communication by other vehicles is to be expected. If yes, a smaller subset of radio resources may be used, e.g. to reduce the likelihood of collisions, if no, a larger subset of radio resources may be used, e.g. to increase a usage of the available radio resources. Furthermore, if some of the vehicles communicate regularly, these vehicles may also coordinate the resource scheduling, without requiring the help of a base station.

Embodiments provide a method for a first vehicle. The method is suitable for determining scheduling information for a wireless communication in a mobile communication system. The method comprises receiving one or more wireless messages via the mobile communication system. A content of the one or more wireless messages indicates a location of one or more second vehicles. Additionally or alternatively, the one or more wireless messages may indicate elements of a route of the one or more second vehicles, or information on a direction of driving of the one or more second vehicles. The method comprises determining information related to a presence of the one or more second vehicles in a vicinity of the first vehicle based on the content of the received one or more wireless messages. The method comprises determining the scheduling information for the wireless communication based on the presence of the one or more second vehicles. The method comprises communicating in the mobile communication system based on the scheduling information. By detecting the presence of the one or more second vehicles, an interference situation may be estimated and the scheduling may be adapted accordingly.

For example, the one or more wireless messages may comprise one or more environmental perception messages. The information related to the presence of the one or more second vehicles may be determined based on environmental perception data comprised in the one or more environmental perception messages. The environmental perception data may enable detecting the presence of vehicles that have not previously communicated with the vehicle.

Additionally or alternatively, the one or more wireless messages may comprise one or more maneuver coordination messages. The information related to the presence of the one or more second vehicles may be determined based on information related to one or more planned maneuvers of the one or more second vehicles comprised in the one or more maneuver coordination messages. By analyzing the maneuver communication messages, not only a location of the one or more second vehicles may be determined, but also a likely communication of the one or more second vehicles over time may be estimated.

The determining of the information related to the presence of the one or more second vehicles may comprise determining information related to an estimated location of the one or more second vehicles based on the content of the one or more wireless messages. This may enable the estimation of the interference situation, e.g. by detecting an amount (i.e. number) and a proximity (i.e. distance, e.g. lateral distance or distance in time) of the one or more second vehicles, and/or by predicting a likely communication of the one or more second vehicles.

In some embodiments, the scheduling information may be based on a first subset of radio resources if the information related to the presence of the one or more second vehicles indicates a first composition of the one or more second vehicles (e.g. a sparse composition of the one or more second vehicles, or a composition that includes (only) vehicles of a cluster of vehicles). The scheduling information may be based on a second subset of radio resources if the information related to the presence of the one or more second vehicles indicates a second composition of the one or more second vehicles (e.g. a dense composition of the one or more second vehicles, a composition that is indicative of an increased amount of communication, or a composition comprising vehicles that are part of a vehicle cluster and vehicles that are in addition to the cluster).

In some embodiments, the one or more wireless messages may be received from a subset of the one or more second vehicles. The subset of the one or more second vehicles may correspond to the one or more second vehicles in the first composition of the one or more second vehicles. The one or more second vehicles may comprise at least one additional vehicle in addition to the subset of the one or more second vehicles in the second composition of the one or more second vehicles. This may enable distinguishing between situations where only intra-cluster communication (within the same cluster) is present or expected (i.e. the first composition), and in which the communication may be coordinated, and situations in which communication with further vehicles is present or expected (i.e. the second composition).

In various embodiments, the scheduling information may be based on a third subset of radio resources if the information related to the presence of the one or more second vehicles indicates a third composition of the one or more vehicles. The one or more second vehicles may comprise at least one additional vehicle and at most a pre-defined number of additional vehicles in addition to the subset of the one or more second vehicles in the second composition of the one or more second vehicles. The one or more second vehicles may comprise more than the pre-defined number of additional vehicles in addition to the subset of the one or more second vehicles in the third composition of the one or more second vehicles. This may enable a further differentiation between only intra-cluster communication (first composition), intra-cluster communication plus communication with few additional vehicles (i.e. at most the pre-defined number, second composition), and intra-cluster communication plus communication with many additional vehicles (i.e. more than the pre-defined number, third composition).

For example, the subset of vehicles of the one or more second vehicles and the first vehicle may form a cluster of vehicles. The one or more wireless messages may be received via intra-cluster communication. This may enable a re-use of existing communication.

In at least some embodiments, the first subset of radio resources comprises the second subset of radio resources and/or the third subset of radio resources. For example, the second subset may comprise the third subset of radio resources. By using an ever smaller subset of radio resources (based on the composition of the one or more second vehicles), a likelihood of wireless message collisions may be decreased.

In some embodiments, the one or more wireless messages are received from a subset of the one or more second vehicles. The method may comprise coordinating the scheduling information with vehicles of the subset of the one or more second vehicles by transmitting the scheduling information to the vehicles of the subset of the one or more second vehicles. This may enable a coordination of the scheduling information within the cluster, e.g. by using a fixed scheduling depending on the number of identified clusters and cluster sizes (number of vehicles per cluster, cluster area, traffic situation, street type, etc.).

For example, the one or more wireless messages may be one or more wireless messages of a vehicle-to-vehicle communication. The one or more wireless messages may be received via vehicular intra-cluster communication, e.g. from the other members of the cluster, or via inter-cluster communication, e.g. from members of other clusters or from vehicles that are not part of (any) cluster. The wireless communication may be direct vehicular communication. The wireless communication may be wireless communication via a sidelink of the mobile communication system.

Embodiments further provide a method for a second vehicle. The method comprises transmitting one or more wireless messages to a first vehicle via a mobile communication system. A content of the one or more wireless messages indicates a location of the second vehicle and/or of one or more further second vehicles. Additionally or alternatively, the one or more wireless messages may indicate elements of a route of the second vehicle or of the one or more second vehicles, or information on a direction of driving of the second vehicle or of the one or more second vehicles. The method comprises receiving scheduling information for a wireless communication in the mobile communication system from the first vehicle. The scheduling information is based on the content of the transmitted one or more wireless messages. The method comprises communicating in the mobile communication system based on the scheduling information. This may enable a coordination of the scheduling information within the cluster.

Embodiments further provide a computer program having a program code for performing at least one of the methods, when the computer program is executed on a computer, a processor, or a programmable hardware component.

Embodiments further provide an apparatus for a first vehicle. The apparatus is suitable for determining scheduling information for a wireless communication in a mobile communication system. The apparatus comprises at least one interface for communicating in the mobile communication system. The apparatus comprises a control module configured to receive one or more wireless messages via the mobile communication system. A content of the one or more wireless messages indicates a location of one or more second vehicles. Additionally or alternatively, the one or more wireless messages may indicate elements of a route of the one or more second vehicles, or information on a direction of driving of the one or more second vehicles. The control module is configured to determine information related to a presence of the one or more second vehicles in a vicinity of the first vehicle based on the content of the received one or more wireless messages. The control module is configured to determine the scheduling information for the wireless communication based on the presence of the one or more second vehicles. The control module is configured to communicate via the at least one interface based on the scheduling information.

Embodiments further provide an apparatus for a second vehicle. The apparatus comprises at least one interface for communicating in a mobile communication system. The apparatus comprises a control module configured to Transmit one or more wireless messages to a first vehicle via the mobile communication system (i.e. via the at least one interface). A content of the one or more wireless messages indicates a location of the second vehicle and/or of one or more further second vehicles. Additionally or alternatively, the one or more wireless messages may indicate elements of a route of the second vehicle or of the one or more second vehicles, or information on a direction of driving of the second vehicle or of the one or more second vehicles. The control module is configured to receive scheduling information for a wireless communication in the mobile communication system from the first vehicle. The scheduling information is based on the content of the transmitted one or more wireless messages. The control module is configured to communicate via the at least one interface based on the scheduling information.

BRIEF DESCRIPTION OF THE FIGURES

Some other features or aspects will be described using the following non-limiting embodiments of apparatuses or methods or computer programs or computer program products by way of example only, and with reference to the accompanying figures, in which.

DETAILED DESCRIPTION

Various example embodiments will now be described more fully with reference to the accompanying drawings in which some example embodiments are illustrated. In the figures, the thicknesses of lines, layers or regions may be exaggerated for clarity. Optional components may be illustrated using broken, dashed or dotted lines.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the invention. Like numbers refer to like or similar elements throughout the description of the figures.

As used herein, the term, "or" refers to a non-exclusive or, unless otherwise indicated (e.g., "or else" or "or in the alternative"). Furthermore, as used herein, words used to describe a relationship between elements should be broadly construed to include a direct relationship or the presence of intervening elements unless otherwise indicated. For example, when an element is referred to as being "connected" or "coupled" to another element, the element may be directly connected or coupled to the other element or intervening elements may be present. In contrast, when an element is referred to as being "directly connected" or "directly coupled" to another element, there are no intervening elements present. Similarly, words such as "between", "adjacent", and the like should be interpreted in a like fashion.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, steps, operations, elements or components, but do not preclude the presence or addition of one or more other features, integers, steps, operations, elements, components or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Figure 1A:
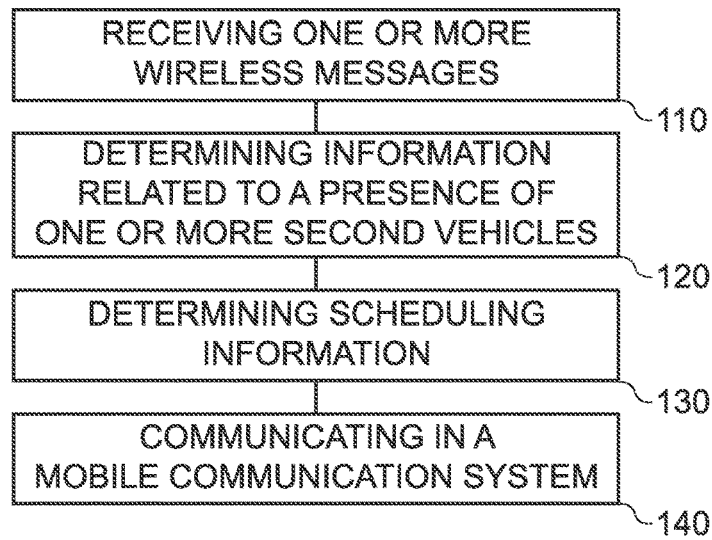
FIGS. 1a and 1b show flow charts of embodiments of a method for a first vehicle.
Figure 1B:
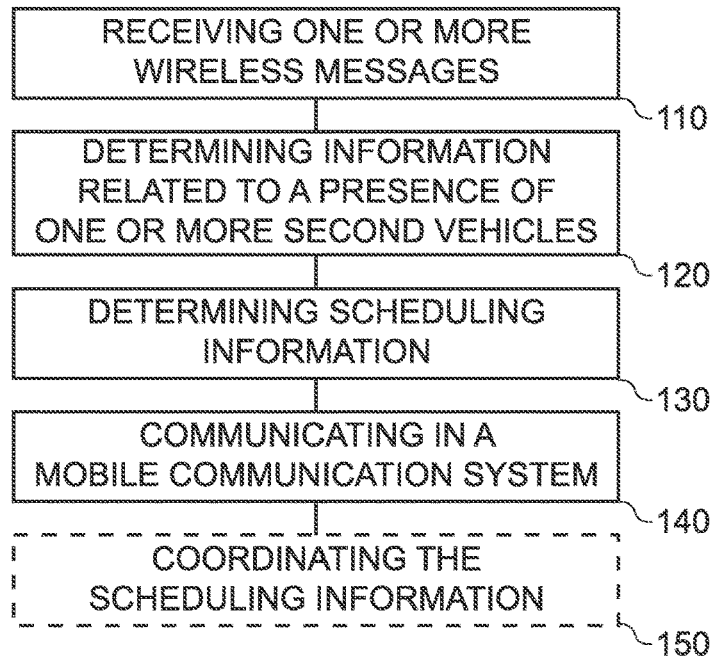

FIGS. 1a and 1b show flow charts of embodiments of a method for a first vehicle 100. The method is suitable for determining scheduling information for a wireless communication in a mobile communication system 300. The method comprises receiving 110 one or more wireless messages via the mobile communication system 300. A content of the one or more wireless messages indicates a location of one or more second vehicles. Additionally or alternatively, the one or more wireless messages may indicate elements of a route of the one or more second vehicles, or information on a direction of driving of the one or more second vehicles. The method comprises determining 120 information related to a presence of the one or more second vehicles 200 in a vicinity of the first vehicle based on the content of the received one or more wireless messages. The method comprises determining 130 the scheduling information for the wireless communication based on the presence of the one or more second vehicles. The method comprises communicating 140 in the mobile communication system 300 based on the scheduling information. For example, the method may be executed by the first vehicle 100.

Figure 1C:
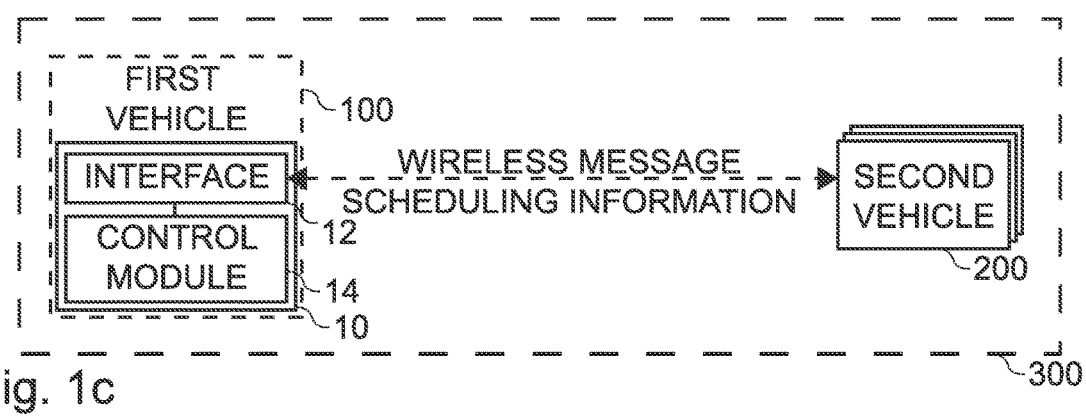
FIG. 1c shows a block diagram of an embodiment of an apparatus for a first vehicle.

FIG. 1c shows a block diagram of an embodiment of a (corresponding) apparatus 10 for the first vehicle 100. The apparatus 10 is suitable for determining scheduling information for a wireless communication in a mobile communication system 300. The apparatus 10 comprises at least one interface 12 for communicating in the mobile communication system 300. The apparatus 10 comprises a control module 14 that is coupled to the at least one interface 12. The control module 14 may be configured to execute the method of FIGS. 1a and/or 1b, e.g. in conjunction with the at least one interface 12. For example, the control module 14 is configured to receive the one or more wireless messages via the mobile communication system 300. The control module 14 is configured to determine the information related to the presence of the one or more second vehicles 200 in a vicinity of the first vehicle based on the content of the received one or more wireless messages. The control module 14 is configured to determine the scheduling information for the wireless communication based on the presence of the one or more second vehicles. The control module 14 is configured to communicate via the at least one interface 12 based on the scheduling information. FIG. 1c further shows the first vehicle 100 comprising the apparatus 10. FIG. 1c further shows a system, e.g. the mobile communication system 300, comprising the first vehicle 100 and at least a subset of vehicles of the one or more second vehicles 200.

The following description relates both to the method of FIGS. 1a and/or 1b and to the apparatus 10 of FIG. 1c.

Embodiments provide a method, apparatus and computer program suitable for determining scheduling information for a wireless communication in a mobile communication system 300. In embodiments, the scheduling information may correspond to information related to a schedule to be used by the first vehicle 100 and/or the one or more second vehicle 200 when transmitting information wirelessly via the mobile communication system 300. For example, a communication via the mobile communication system 300 may be based on a plurality of radio resources, i.e. frequency resources, time resources, spatial resources and/or code resources. The scheduling information may specify which user equipment, such as the first vehicle or the one or more second vehicles, is to use which of the plurality of radio resources for the wireless communication. In at least some embodiments, the wireless communication is a wireless communication via a sidelink of the mobile communication system 300. In other words, the wireless communication may be direct vehicular communication. Accordingly, the scheduling information may be scheduling information for a wireless communication via a sidelink of the mobile communication system 300, i.e. the scheduling information may specify radio resources to be used for the wireless communication via the sidelink of the mobile communication system 300. The scheduling information may be scheduling information for a direct vehicular communication, i.e. the scheduling information may specify radio resources to be used for the direct vehicular communication.

The method comprises receiving 110 one or more wireless messages via the mobile communication system 300. For example, the one or more wireless messages may be one or more wireless messages of a vehicle-to-vehicle communication. In other words, the one or more wireless messages may be received directly from another vehicle or from one or more other vehicles, e.g. from at least a subset of vehicles of the one or more second vehicles. For example, a subset of vehicles of the one or more further vehicles may form a cluster of vehicles. The one or more wireless messages may be received via vehicular intra-cluster communication, e.g. from the subset of vehicles of the one or more second vehicles. In at least some embodiments, the one or more wireless messages are received from a subset of vehicles of the one or more vehicles, e.g. without involving a base station of the mobile communication system 300.

A content of the one or more wireless messages indicates a location of one or more second vehicles. Additionally or alternatively, the one or more wireless messages may indicate elements of a route of the one or more second vehicles, or information on a direction of driving of the one or more second vehicles. For example, the one or more second vehicles may be (all of or a majority of) the vehicles that are located in a vicinity of the first vehicle 100. For example, at least some of the wireless messages may comprise the location of at least some of the one or more second vehicles. For example, at least some of the wireless messages may be cooperative awareness messages or decentralized environmental notification messages comprising a location of the vehicles of the one or more second vehicles that have transmitted said cooperative awareness messages or decentralized environmental notification messages. Additionally or alternatively, at least some of the wireless messages may be maneuver coordination messages comprising a location of the vehicles of the one or more second vehicles that have transmitted said maneuver coordination messages. Additionally or alternatively, at last some of the wireless messages may be environmental perception messages comprising a location of the vehicles of the one or more second vehicles that have transmitted said environmental perception messages and/or a location of other vehicles of the one or more second vehicles located near the vehicles of the one or more second vehicles that have transmitted said environmental perception messages. The environmental perception messages may further comprise information on the elements of the route of the one or more second vehicles, or information on a direction of driving of the one or more second vehicles.

The method comprises determining 120 information related to a presence of the one or more second vehicles in a vicinity of the first vehicle based on the content of the received one or more wireless messages. In general, the determining 120 of the information related to the presence may determine that and/or which other vehicles are located near the vehicle, e.g. to enable the vehicle to estimate an interference situation. For example, the interference situation may be based on the amount of radio communication in the vicinity of the first vehicle, i.e. indicative of the amount of radio communication in the vicinity of the first vehicle. For example, the vicinity of the first vehicle may relate to a pre-defined distance around the first vehicle. In other words, a second vehicle may be in vicinity of the first vehicle if a distance between the first and second vehicle is at most the pre-defined distance. In some embodiments, the determining 120 of the information related to the presence of the one or more second vehicles in a vicinity of the first vehicle may further comprise determining further status information on the travelling of the one or more second vehicles. In other words, the information related to the presence of the one or more second vehicles in a vicinity of the first vehicle may further comprise the further status information. In some embodiments, the determining 120 of the information related to the presence of the one or more second vehicles in the vicinity of the first vehicle may comprise estimating a number of the one or more second vehicles in the vicinity of the first vehicles. In some other embodiments, a "map" of vehicles surrounding the first vehicle may be created. In other words, the determining 120 of the information related to the presence of the one or more second vehicles may comprise determining information related to an estimated location of the one or more second vehicles based on the content of the one or more wireless messages. Accordingly, the information related to the presence of the one or more second vehicles that are present in the vicinity of the first vehicle may comprise at least one of a number and of an estimated location of the one or more second vehicles that are present in the vicinity of the first vehicle.

As written above, the one or more wireless messages comprise one or more maneuver coordination messages (MCM). Maneuver coordination messages may comprise information related one or more planned maneuvers of the one or more second vehicles, such as lane changes, brake applications etc., that are coordinated among at least two of the second vehicles. The information related to the presence of the one or more second vehicles may be determined based on information related to one or more planned maneuvers of the one or more second vehicles comprised in the one or more maneuver coordination messages. For example, the information related to the estimated location of the one or more second vehicles may be determined based on the one or more planned maneuvers of the one or more second vehicles. In other words, the one or more planned maneuvers of the one or more second vehicles may indicate information related to the location (e.g. information related to an intended trajectory) of the one or more second vehicles.

Additionally or alternatively, the one or more wireless messages may comprise one or more environmental perception messages, i.e. Cooperative Perception Messages (CPM). The information related to the presence of the one or more second vehicles may be determined based on environmental perception data comprised in the one or more environmental perception messages. For example, the environmental perception data may comprise modeling information for an area surrounding the one or more second vehicles. The modeling information may relate to objects that have been identified by a vehicle of (the subset of) the one or more second vehicles, using one or more perception sensors of said vehicle. For example, the one or more perception sensors of the vehicles may comprise at least one of a RADAR (Radio Detection and Ranging, in the following denoted "radar") sensor, a LIDAR (Light Detection and Ranging, in the following denoted "lidar") sensor, a camera sensor and an ultrasound sensor. The environmental perception data might not comprise the respective sensor data but might correspond to a high-level abstraction of the sensor data of the one or more perception sensors. For example, an environmental perception model of the environmental perception data may comprise information related to a location and/or of an extent of the objects (e.g. the vehicles of the one or more second vehicles) that have been identified by the respective vehicle using one or more perception sensors of the respective vehicle. In some embodiments, an environmental perception model of the environmental perception data may comprise information related to an identifier of the objects (e.g. the vehicles of the one or more second vehicles) that have been identified by the respective vehicle using one or more perception sensors of the respective vehicle, e.g. if the objects are connected vehicles. For example, the environmental perception data may comprise information related to a location of the objects that have been identified by said vehicle, e.g. information related to a location of vehicles of the one or more second vehicles. For example, the information related to the estimated location of the one or more second vehicles may be determined based on the environmental perception data comprised in the one or more environmental perception messages, e.g. based on the information related to the location of the objects.

The method comprises determining 130 the scheduling information for the wireless communication based on the presence of the one or more second vehicles. In some embodiments, the scheduling information may be determined 130 based on a composition of the one or more second vehicles. For example, the scheduling information may be based on a first subset of radio resources if the information related to the presence of the one or more second vehicles indicates a first composition of the one or more second vehicles. In other words, the determining of the scheduling information may comprise selecting one or more radio resources of the first subset of radio resources for the scheduling information if the information related to the presence of the one or more second vehicles indicates a first composition of the one or more second vehicles. The scheduling information may be based on a second subset of radio resources if the information related to the presence of the one or more second vehicles indicates a second composition of the one or more second vehicles. In other words, the determining of the scheduling information may comprise selecting one or more radio resources of the second subset of radio resources for the scheduling information if the information related to the presence of the one or more second vehicles indicates a second composition of the one or more second vehicles. In some cases, the scheduling information may be based on a third subset of radio resources if the information related to the presence of the one or more second vehicles indicates a third composition of the one or more vehicles. In other words, the determining of the scheduling information may comprise selecting one or more radio resources of the third subset of radio resources for the scheduling information if the information related to the presence of the one or more second vehicles indicates a third composition of the one or more second vehicles. For example, the first subset of radio resources may comprise the second subset of radio resources and/or the third subset of radio resources. In other words, the first subset of radio resources may comprise more radio resources than the second subset of radio resources. The second subset of radio resources may comprise more radio resources than the third subset of radio resources. Selecting the radio resources for the scheduling information from the third subset of radio resources may yield a lower probability of collision of the wireless communication than selecting the radio resources from the second subset of radio resources. Selecting the radio resources for the scheduling information from the second subset of radio resources may yield a lower probability of collision of the wireless communication than selecting the radio resources from the first subset of radio resources.

In this context, the composition may be defined in relation to a number of vehicles present in the vicinity of the first vehicle, e.g. the composition may be one of a sparse composition and a dense composition. Accordingly, the first composition may be a sparse composition, i.e. a number of vehicles of the one or more second vehicles being present in a vicinity of the first vehicle may be at most a threshold value, and the second composition may be a dense composition, i.e. a number of vehicles of the one or more second vehicles being present in a vicinity of the first vehicle may be at larger than the threshold value.

Alternatively, the composition may be defined in relation to roles that are employed by the one or more second vehicles. For example, at least some of the one or more second vehicles may be vehicles that form a cluster with the first vehicle. In other words, the subset of the one or more second vehicles may form a cluster of vehicles with the first vehicle. The subset of vehicles of the one or more second vehicles and the first vehicle may form a cluster of vehicles. For example, in a cluster of vehicles, members of the cluster may share information, and may drive in a coordinated manner. Within a cluster, a group of vehicles may coordinate driving maneuvers. Among the vehicles of the cluster, cellular vehicle-to-vehicle communication (i.e. intra-cluster communication) may be used to coordinate the cluster. A cluster of vehicles may comprise a cluster head, i.e. a vehicle that coordinates a communication of the cluster of vehicles. For example, the first vehicle may be the cluster head of the cluster of vehicles. The one or more wireless messages may be received via intra-cluster communication. The membership of the vehicles of the one or more second vehicles in the cluster may be used to determine the composition of the one or more second vehicles.

For example, in a first composition of the one or more second vehicles, the one or more second vehicles might (only) comprise vehicles that are part of the cluster of vehicles. In other words, the subset of the one or more second vehicles may correspond to the one or more second vehicles in the first composition of the one or more second vehicles. All of the one or more second vehicles might be comprised in the cluster of vehicles.

In the second composition, the one or more second vehicles may comprise other vehicles in addition to the vehicles of the cluster of vehicles. In other words, the one or more second vehicles might comprise at least one additional vehicle in addition to the subset of the one or more second vehicles in the second composition of the one or more second vehicles.

In some cases, three different compositions may be distinguished, a first composition, in which the one or more second vehicles (only) comprise vehicles that are part of the cluster of vehicles, a second composition, in which the one or more second vehicles comprise a low number of other vehicles in addition to the vehicles of the cluster of vehicles, and a third composition, in which the one or more second vehicles comprise a high number of other vehicles in addition to the vehicles of the cluster of vehicles. In other words, the one or more second vehicles may comprise at least one additional vehicle and at most a pre-defined number of additional vehicles in addition to the subset of the one or more second vehicles in the second composition of the one or more second vehicles. The one or more second vehicles may comprise more than the pre-defined number of additional vehicles in addition to the subset of the one or more second vehicles in the third composition of the one or more second vehicles.

In some embodiments, maneuvers comprised in the one or more maneuver coordination messages may be associated with different priority levels. For example, a planned maneuver comprising a coordinated braking offered may be associated with a higher priority level (as its consequences are more imminent) than a planned maneuver of a coordinated lane change. In at least some embodiments, the scheduling information for the wireless communication may be further based on the priority level or priority levels of the one or more planned maneuvers.

The method further comprises communicating 140 in the mobile communication system 300 based on the scheduling information. For example, the method may comprise choosing radio resources of the mobile communication system for communicating in the mobile communication system based on the scheduling information. The method may comprise using the chosen radio resources of the mobile communication system for the wireless communication (e.g. between the first vehicle and the one or more second vehicles). In general, the wireless communication may occur between the first vehicle and the one or more second vehicles.

In some embodiments, as shown in FIG. 1*b*, the method may comprise coordinating 150 the scheduling information with vehicles of the subset of the one or more second vehicles by transmitting the scheduling information to the vehicles of the subset of the one or more second vehicles. For example, the one or more second vehicles may use the transmitted scheduling information to communicate in the mobile communication system 300. In some embodiments, the one or more second vehicles may acknowledge the transmitted scheduling information. In other words, the method may comprise an acknowledgement to the scheduling information from the one or more second vehicles.

In at least some embodiments, the first vehicle and/or the one or more second vehicles (or the subset of vehicles of the one or more second vehicles) may be connected vehicles, i.e. autonomous vehicles or semi-autonomous road users vehicles that are configured to communicate with other vehicles or with a backend server in order to make their driving decisions. For example, the first vehicle and/or the one or more second vehicles (or the subset of vehicles of the one or more second vehicles) may be vehicles that are configured to coordinate their autonomous or semi-autonomous driving with other vehicles.

In at least some embodiments, the mobile communication system may be a vehicular communication system e.g. a vehicle-to-network (V2N) communication system. For example, the mobile communication system may be or may be based on a C-V2X (Cellular-Vehicle-to-Anything, which may comprise Long Term Evolution Vehicle-to-Anything, LTE-V2X, 5th generation mobile communication system V2X, 5G-V2X, and New Radio V2X, NR-V2X) mobile communication system. The mobile communication system may support two communication modes: PC5, which is used between vehicles, and Uu, which is used between vehicles and base stations. Using PC5 and Uu, the mobile communication system may support direct vehicle-to-vehicle communication (without involvement of a base station as a communication hop, using PC5, either managed by the base station or autonomously), vehicle-to-vehicle communication via a base station of the mobile communication system, and vehicle-to-network communication via a base station of the mobile communication system. The direct vehicle-to-vehicle communication may be based on the same radio resources (e.g. the same frequency resources) as the communication via the base station of the vehicle.

The at least one interface 12 may correspond to one or more inputs and/or outputs for receiving and/or transmitting information, which may be in digital (bit) values according to a specified code, within a module, between modules or between modules of different entities. The at least one interface may be configured to communicate in the mobile communication system.

In embodiments the control module 14 may be implemented using one or more processing units, one or more processing devices, any means for processing, such as a processor, a computer or a programmable hardware component being operable with accordingly adapted software. In other words, the described function of the control module 14 may as well be implemented in software, which is then executed on one or more programmable hardware components. Such hardware components may comprise a general-purpose processor, a Digital Signal Processor (DSP), a micro-controller, etc.

More details and aspects of the method and/or apparatus 10 are mentioned in connection with the proposed concept or one or more examples described above or below (e.g. FIGS. 2*a* to 3). The method and/or apparatus 10 may comprise one or more additional optional features corresponding to one or more aspects of the proposed concept or one or more examples described above or below.

Figure 2A:
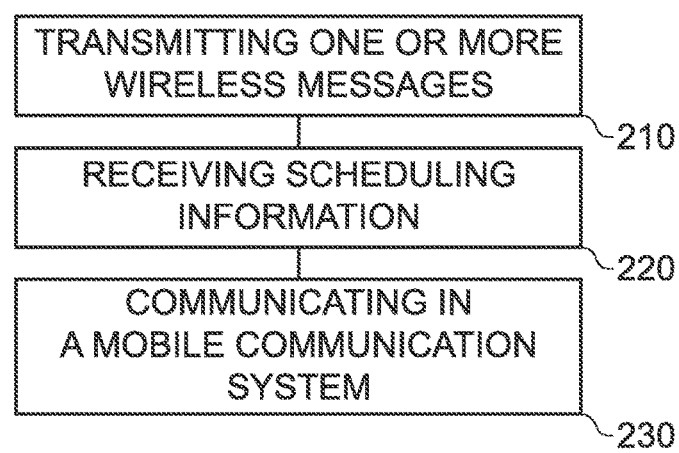
FIG. 2a shows a flow chart of an embodiment of a method for a second vehicle.

FIG. 2*a* shows a flow chart of an embodiment of a method for a second vehicle 200. For example, the second vehicle 200 may be a vehicle of the one or more second vehicles 200, e.g. a vehicle of the subset of vehicles of the one or more second vehicles 200. The method comprises transmitting 210 one or more wireless messages to a first vehicle 100 via a mobile communication system 300. A content of the one or more wireless messages indicates a location of the second vehicle and/or of one or more further second vehicles. The method comprises receiving 220 scheduling information for a wireless communication in the mobile communication system 300 from the first vehicle (e.g. via the mobile communication system 300). The scheduling information is based on the content of the transmitted one or more wireless messages. The method comprises communicating 230 in the mobile communication system 300 based on the scheduling information. For example, the method may be executed by the second vehicle 200.

Figure 2B:
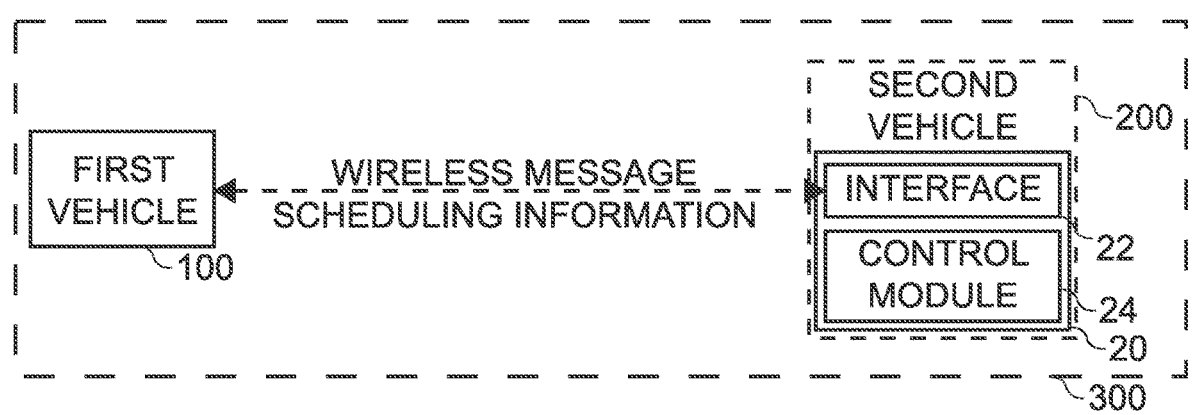
FIG. 2b shows a block diagram of an embodiment of an apparatus for a second vehicle.

FIG. 2b shows a block diagram of an embodiment of a (corresponding) apparatus 20 for the second vehicle 20. The apparatus 20 comprises at least one interface 22 for communicating in a mobile communication system 300. The apparatus 20 comprises control module 24 that is coupled to the at least one interface 22. The control module 24 may be configured to execute the method of FIG. 2a. For example, the control module is configured to transmit the one or more wireless messages to the first vehicle 100 via the mobile communication system 300 (e.g. via the at least one interface 22). The control module 24 is configured to receive the scheduling information for a wireless communication in the mobile communication system 300 from the first vehicle (e.g. via the at least one interface 22 and the mobile communication system 300). The control module 24 is configured to communicate via the at least one interface 22 based on the scheduling information. FIG. 2b further shows the second vehicle 200 comprising the apparatus 20. FIG. 2b further shows a system, e.g. the mobile communication system 300, comprising the second vehicle 200 and the first vehicle 100.

The following description relates to both the method of FIG. 2a and the apparatus 20 of FIG. 2b.

Embodiments further provide a method, apparatus and computer program for the second vehicle, e.g. for a vehicle of the one or more second vehicles as introduced in connection with FIGS. 1a to 1c. In embodiments, the second vehicle may be the source of at least some of the one or more wireless messages received by the first vehicle of FIG. 1a to 1c.

Accordingly, the method comprises transmitting 210 the one or more wireless messages to the first vehicle 100 via a mobile communication system 300. The content of the one or more wireless messages indicates a location of the second vehicle and/or of one or more further second vehicles. The one or more second vehicles of FIGS. 1a to 1c may comprise the second vehicle and the one or more further second vehicles. For example, at least some of the one or more wireless messages may comprise the location of the second vehicle and/or of the one or more further second vehicles. For example, the one or more wireless messages may comprise one or more cooperative awareness messages or decentralized environmental notification messages comprising a location of the second vehicle. Additionally or alternatively, the one or more wireless messages may comprise one or more maneuver coordination messages comprising the location of the second vehicle and/or a location of the one or more further second vehicles (e.g. if the one or more further second vehicles take part in the maneuver). Additionally or alternatively, the one or more wireless messages may comprise one or more environmental perception messages comprising a location of the second vehicle and of the one or more further second vehicles perceived by the second vehicle. In at least some embodiments, the one or more maneuver coordination messages, the one or more environmental perception messages, the one or more cooperative awareness messages and/or the one or more decentralized environmental notification messages may originate from the second vehicle, i.e. be generated by the second vehicle.

The method comprises receiving 220 scheduling information for a wireless communication in the mobile communication system 300 from the first vehicle. The scheduling information is based on the content of the transmitted one or more wireless messages. For example, the scheduling information may be determined by the first vehicle based on the content of the transmitted one or more wireless messages (as described in connection with FIGS. 1a to 1c).

The method comprises communicating 230 in the mobile communication system 300 based on the scheduling information. For example, the method may comprise choosing radio resources of the mobile communication system for communicating in the mobile communication system based on the scheduling information. The method may comprise using the chosen radio resources of the mobile communication system for the wireless communication (e.g. between the first vehicle and the one or more second vehicles). In general, the wireless communication may occur between the first vehicle and the second vehicle (and optionally the one or more further second vehicles).

The at least one interface 22 may correspond to one or more inputs and/or outputs for receiving and/or transmitting information, which may be in digital (bit) values according to a specified code, within a module, between modules or between modules of different entities. The at least one interface may be configured to communicate in the mobile communication system.

In embodiments the control module 24 may be implemented using one or more processing units, one or more processing devices, any means for processing, such as a processor, a computer or a programmable hardware component being operable with accordingly adapted software. In other words, the described function of the control module 24 may as well be implemented in software, which is then executed on one or more programmable hardware components. Such hardware components may comprise a general purpose processor, a Digital Signal Processor (DSP), a micro-controller, etc.

More details and aspects of the method and/or apparatus 20 are mentioned in connection with the proposed concept or one or more examples described above or below (e.g. FIG. 1a to 1c, 3). The method and/or apparatus 20 may comprise one or more additional optional features corresponding to one or more aspects of the proposed concept or one or more examples described above or below.

At least some embodiments relate to apparatuses, methods and computer programs that are aimed at improving an inefficient PC5 scheduling. At least some embodiments may be based on using control signaling of environmental data for scheduling. Embodiments may create UE-to-UE scheduling based on environmental information (e.g. perception models). Embodiments may avoid hidden node and interference problems for PC5 scheduling by using environmental information (such as CPM, MCM, or in general sensor-based environmental information) and inter-cluster cooperation (to create cooperative scheduling).

Figure 3:
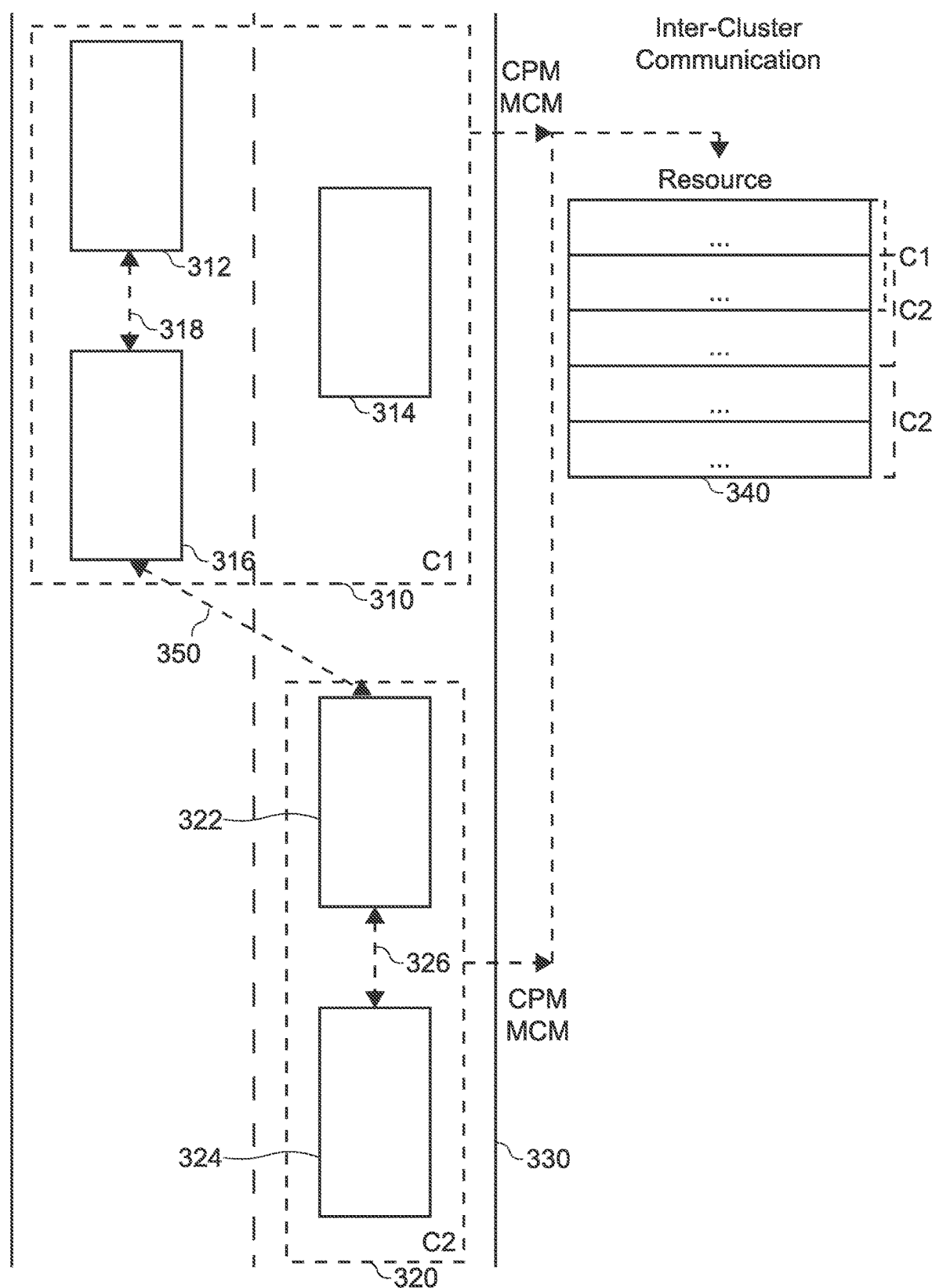
FIG. 3 shows a schematic diagram of an exemplary embodiment.

FIG. 3 shows a schematic diagram of an exemplary embodiment. In FIG. 3, two clusters C1 310 and C2 320, comprising vehicles 312; 314; 316 and 322; 324 respectively, are traveling on a road 330. The clusters of vehicles use sensor-based wireless messages, such as CPM and MCM, which are exchanged using inter-cluster communication 350, to select resources from a subset of resources 340, e.g. to provide scheduling information for the inter-cluster communication and the intra-cluster communication. Within the clusters, the respective vehicles communicate using intra-cluster communication 318; 326. In the example shown in FIG. 3, cluster C1 310 may be assigned the first two resource blocks of subset of resources 340, while cluster C2 320 may be assigned resources blocks two and three, and four and five. For example, the assignment may be based on scheduling information that is exchanged between the vehicle clusters.

As already mentioned, in embodiments the respective methods may be implemented as computer programs or codes, which can be executed on a respective hardware. Hence, another embodiment is a computer program having a program code for performing at least one of the above methods, when the computer program is executed on a computer, a processor, or a programmable hardware component. A further embodiment is a non-transitory computer-readable storage medium storing instructions which, when executed by a computer, processor, or programmable hardware component, cause the computer to implement one of the methods described herein.

A person of skill in the art would readily recognize that steps of various above-described methods can be performed by programmed computers, for example, positions of slots may be determined or calculated. Herein, some embodiments are also intended to cover program storage devices, e.g., digital data storage media, which are machine- or computer-readable and encode machine-executable or computer-executable programs of instructions where said instructions perform some or all of the steps of methods described herein. The program storage devices may be, e.g., digital memories, magnetic storage media such as magnetic disks and magnetic tapes, hard drives, or optically readable digital data storage media. The embodiments are also intended to cover computers programmed to perform said steps of methods described herein or (field) programmable logic arrays ((F)PLAs) or (field) programmable gate arrays ((F)PGAs), programmed to perform said steps of the above-described methods.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, Digital Signal Processor (DSP) hardware, network processor, application specific integrated circuit (ASIC), field programmable gate array (FPGA), read only memory (ROM) for storing software, random access memory (RAM), and non-volatile storage. Other hardware, conventional or custom, may also be included. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer-readable medium and so executed by a computer or processor, whether or not such computer or processor is explicitly shown.

Furthermore, the following claims are hereby incorporated into the detailed description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective steps of these methods.

LIST OF REFERENCE SIGNS

10 Apparatus for a first vehicle
12 Interface
14 Control module
20 Apparatus for a second vehicle
22 Interface
24 Control module
100 First vehicle
110 Receiving one or more wireless messages
120 Determining information related to a presence of one or more second vehicles
130 Determining scheduling information
140 Communicating in a mobile communication system
150 Coordinating the scheduling information
200 Second vehicle
210 Transmitting one or more wireless messages
220 Receiving scheduling information
230 Communicating in a mobile communication system
300 Mobile communication system
310 First cluster C1
312, 314, 316 Vehicles of cluster C1
318 Intra-cluster communication
320 Second cluster C2
322, 324 Vehicles of cluster C2
326 Intra-cluster communication
330 Road
340 Subset of resources
350 Inter-cluster communication

What is claimed is:
1. A method for a first vehicle, wherein the method is suitable for determining scheduling information for a wireless communication in a mobile communication system, the method comprising:

receiving one or more wireless messages via the mobile communication system, a content of the one or more wireless messages indicating:
a location of one or more second vehicles, and
environmental perception data comprising a location of one or more further second vehicles in a vicinity of the location of one or more second vehicles and modeling information for an area surrounding the one or more second vehicles;
determining information related to a presence of the one of more second vehicles in a vicinity of the first vehicle based on the content of the received one or more wireless messages,
wherein the determining of the information related to the presence of the one or more second vehicles comprises determining information related to an estimated location of the one or more second vehicles based on the content of the one or more wireless messages;
estimating an interference situation based on an amount and a proximity of the one or more second vehicles in the vicinity of the first vehicle;
determining the scheduling information for the wireless communication based on the information related to the presence of the one or more second vehicles, wherein the scheduling is adapted to the interference situation; and
communicating based on the scheduling information.

2. The method according to claim 1,
wherein the one or more wireless messages comprise one or more maneuver coordination messages, and
wherein the information related to the presence of the one or more second vehicles is determined based on information related to one or more planned maneuvers of the one or more second vehicles comprised in the one or more maneuver coordination messages.

3. The method according to claim 1,
wherein the scheduling information is based on a first subset of radio resources if the information related to the presence of the one of more second vehicles indicates a first composition of the one or more second vehicles, and
wherein the scheduling information is based on a second subset of radio resources if the information related to the presence of the one of more second vehicles indicates a second composition of the one or more second vehicles.

4. The method according to claim 3,
wherein the one or more wireless messages are received from a subset of the one or more second vehicles,
wherein the subset of the one or more second vehicles corresponds to the one or more second vehicles in the first composition of the one or more second vehicles, and
wherein the one or more second vehicles comprise at least one additional vehicle in addition to the subset of the one or more second vehicles in the second composition of the one or more second vehicles.

5. The method according to claim 4,
wherein the scheduling information is based on a third subset of radio resources if the information related to the presence of the one of more second vehicles indicates a third composition of the one or more vehicles,
wherein the one or more second vehicles comprise at least one additional vehicle and at most a pre-defined number of additional vehicles in addition to the subset of the one or more second vehicles in the second composition of the one or more second vehicles, and wherein the one or more second vehicles comprise more than the pre-defined number of additional vehicles in addition to the subset of the one or more second vehicles in the third composition of the one or more second vehicles.

6. The method according to claim 4,
wherein the subset of vehicles of the one or more second vehicles and the first vehicle form a cluster of vehicles, and
wherein the one or more wireless messages are received via intra-cluster communication.

7. The method according to claim 3, wherein the first subset of radio resources comprises the second subset of radio resources and/or a third subset of radio resources.

8. The method according to claim 1,
wherein the one or more wireless messages are received from a subset of the one or more second vehicles, and
wherein the method comprises coordinating the scheduling information with vehicles of the subset of the one or more second vehicles by transmitting the scheduling information to the vehicles of the subset of the one or more second vehicles.

9. The method according to claim 1,
wherein the one or more wireless messages are one or more wireless messages of a vehicle-to-vehicle communication,
and/or wherein the one or more wireless messages are received via vehicular intra-cluster communication,
and/or wherein the wireless communication is direct vehicular communication,
and/or wherein the wireless communication is wireless communication via a sidelink of the mobile communication system.

10. The method of claim 1, wherein the content of the one or more wireless messages indicates a route of the one or more second vehicles or information on a direction of driving of the one or more second vehicles.

11. A method for a second vehicle, the method comprising: transmitting one or more wireless messages to a first vehicle via a mobile communication system, a content of the one or more wireless messages indicating:
a location of the second vehicle, and
environmental perception data comprising a location of one or more further second vehicles in a vicinity of the location of the second vehicle and modeling information for an area surrounding the second vehicle;
receiving scheduling information for a wireless communication in the mobile communication system from the first vehicle,
wherein the scheduling information is based on the content of the transmitted one or more wireless messages, and
wherein the scheduling is adapted to an estimated interference situation that is based on an amount and a proximity of the one or more second vehicles in a vicinity of the first vehicle; and
communicating based on the scheduling information.

12. The method of claim 11, wherein the content of the one or more wireless messages indicates a route of the one or more second vehicles or information on a direction of driving of the one or more second vehicles.

13. A non-transitory, computer-readable storage medium having a program code for performing the method for a first vehicle of claim 1, when the program code is executed on a computer, a processor, or a programmable hardware component.

14. A non-transitory, computer-readable storage medium having a program code for performing the method for a second vehicle of claim 11, when the program code is executed on a computer, a processor, or a programmable hardware component.

15. An apparatus for a first vehicle, wherein the apparatus is suitable for determining scheduling information for a wireless communication in a mobile communication system, the apparatus comprising:
at least one interface for communicating in the mobile communication system; and
a processor configured to:
receive one or more wireless messages via the mobile communication system, a content of the one or more wireless messages indicating:
a location of one or more second vehicles, and
environmental perception data comprising a location of one or more further second vehicles in a vicinity of the location of one or more second vehicles and modeling information for an area surrounding the one or more second vehicles;
determine information related to a presence of the one of more second vehicles in a vicinity of the first vehicle based on the content of the received one or more wireless messages,
wherein the determining of the information related to the presence of the one or more second vehicles comprises determining information related to an estimated location of the one or more second vehicles based on the content of the one or more wireless messages,
estimate an interference situation based on an amount and a proximity of the one or more second vehicles in the vicinity of the first vehicle,
determine the scheduling information for the wireless communication based on the information related to the presence of the one or more second vehicles, and
communicate via the at least one interface based on the scheduling information.

16. An apparatus for a second vehicle, the apparatus comprising: at least one interface for communicating in a mobile communication system; and
a processor configured to:
transmit one or more wireless messages to a first vehicle via the mobile communication system, a content of the one or more wireless messages indicating:
a location of the second vehicle, and
environmental perception data comprising a location of one or more further second vehicles in a vicinity of the location of the second vehicle and modeling information for an area surrounding the second vehicle;
receive scheduling information for a wireless communication in the mobile communication system from the first vehicle,
wherein the scheduling information is based on the content of the transmitted one or more wireless messages, and
wherein the scheduling is adapted to an estimated interference situation that is based on an amount and a proximity of the one or more second vehicles in a vicinity of the first vehicle, and
communicate via the at least one interface based on the scheduling information.

* * * * *